(12) United States Patent
Wang Lee

(10) Patent No.: US 7,118,209 B1
(45) Date of Patent: Oct. 10, 2006

(54) SPECTACLES

(76) Inventor: Jeffrey Wang Lee, No. 473, Jong-Shan S. Rd., Yung-Kang City, Tainan Hsien (TW)

( * ) Notice: Subject to any disclaimer, the term of this patent is extended or adjusted under 35 U.S.C. 154(b) by 0 days.

(21) Appl. No.: 11/234,171

(22) Filed: Sep. 26, 2005

(51) Int. Cl.
*G02C 1/00* (2006.01)
(52) U.S. Cl. .......................... 351/86; 351/83; 351/103; 351/106
(58) Field of Classification Search ................. 351/83, 351/86, 85, 103, 106, 41
See application file for complete search history.

(56) References Cited

U.S. PATENT DOCUMENTS 6,966,646 B1 * 11/2005 Ming ........................ 351/86

* cited by examiner

*Primary Examiner*—Hung Xuan Dang
(74) *Attorney, Agent, or Firm*—Hershkovitz & Associates; Abe Hershkovitz

(57) ABSTRACT

A pair of spectacles has a frame and two lenses. The frame has a skeleton and a bridge formed between the skeleton and dividing the skeleton into two symmetrical members. Two first lugs are transversely formed in a distal end of the skull and adjacent to the bridge, and two second lugs are uprightly formed in a free end of the skull and opposed to the bridge. Two lenses are respectively mounted on the members and respectively have a first channel and a second channel defined in a periphery of the lenses. Two first tabs and two second tabs are respectively mounted on the lenses and the frame in turn, whereby the lenses are securely provided on the frame with easy assembly.

4 Claims, 4 Drawing Sheets

SPECTACLES

BACKGROUND OF THE INVENTION

1. Field of the Invention

The present invention relates to a pair of spectacles, and more particularly to a pair of spectacles which is easy to assemble securely.

2. Description of Related Art

A conventional pair of spectacles is composed of a frame and two lenses. Multiple fasteners are inserted into the lenses and the frame or the lenses are respectively mated with the frame so that the lenses are respectively mounted on the frame to form the conventional pair of spectacles.

However, it is easy for the fasteners to damage the lenses when being inserted into the lenses. This may cause serious financial loss as the lenses are expensive. Furthermore, the fasteners are so small that it is inconvenient to mount the fasteners on the lenses and the frame. Additionally, if the lenses are mated with the frame without the fasteners, they are not securely provided on the frame.

Therefore, the invention provides a pair of spectacles to mitigate or obviate the aforementioned problems.

SUMMARY OF THE INVENTION

The main objective of the present invention is to provide a pair of spectacles which is easy to assemble securely.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
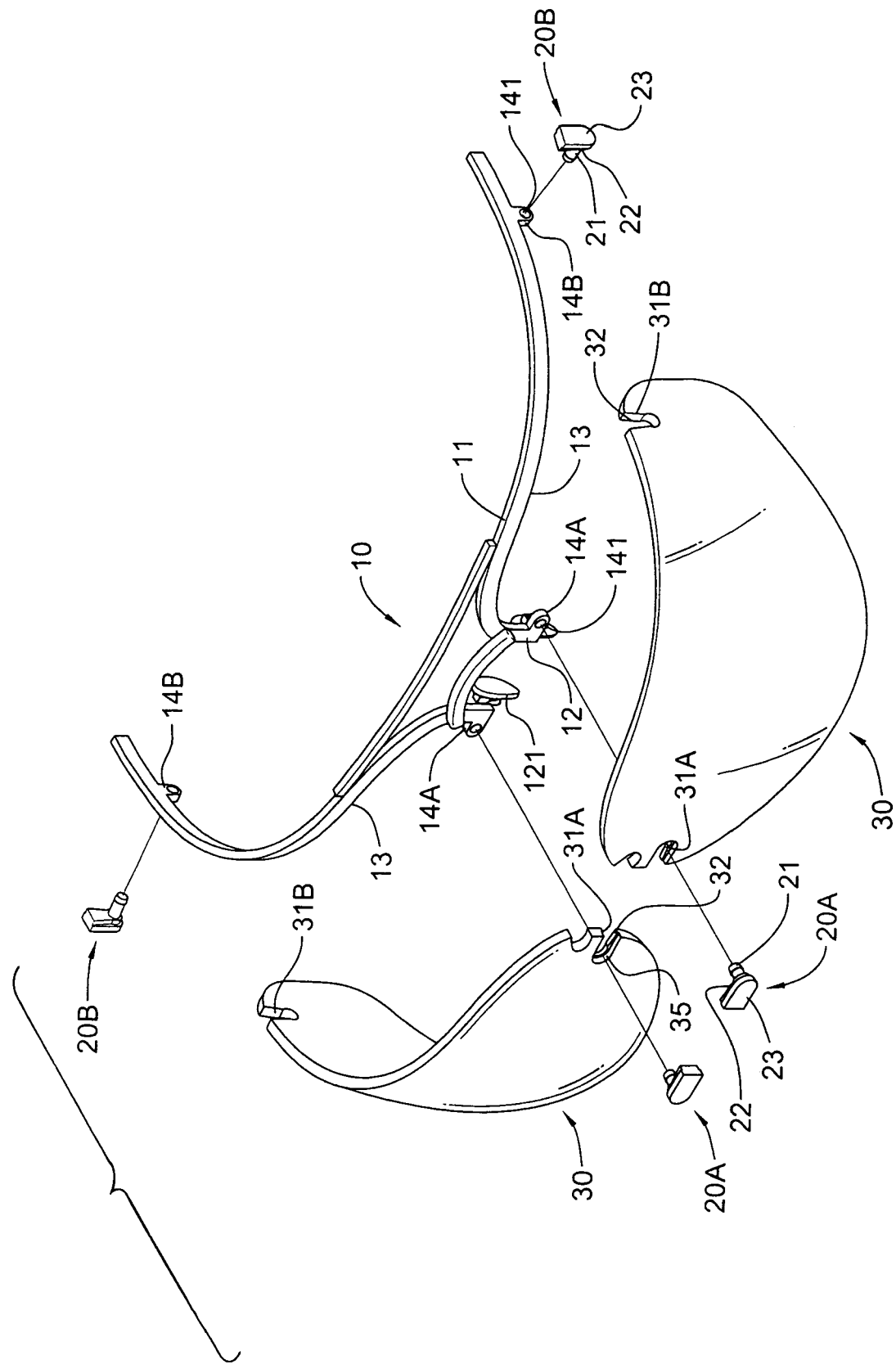
FIG. 1 is an exploded perspective view of a pair of spectacles in accordance with the present invention.
Figure 2:
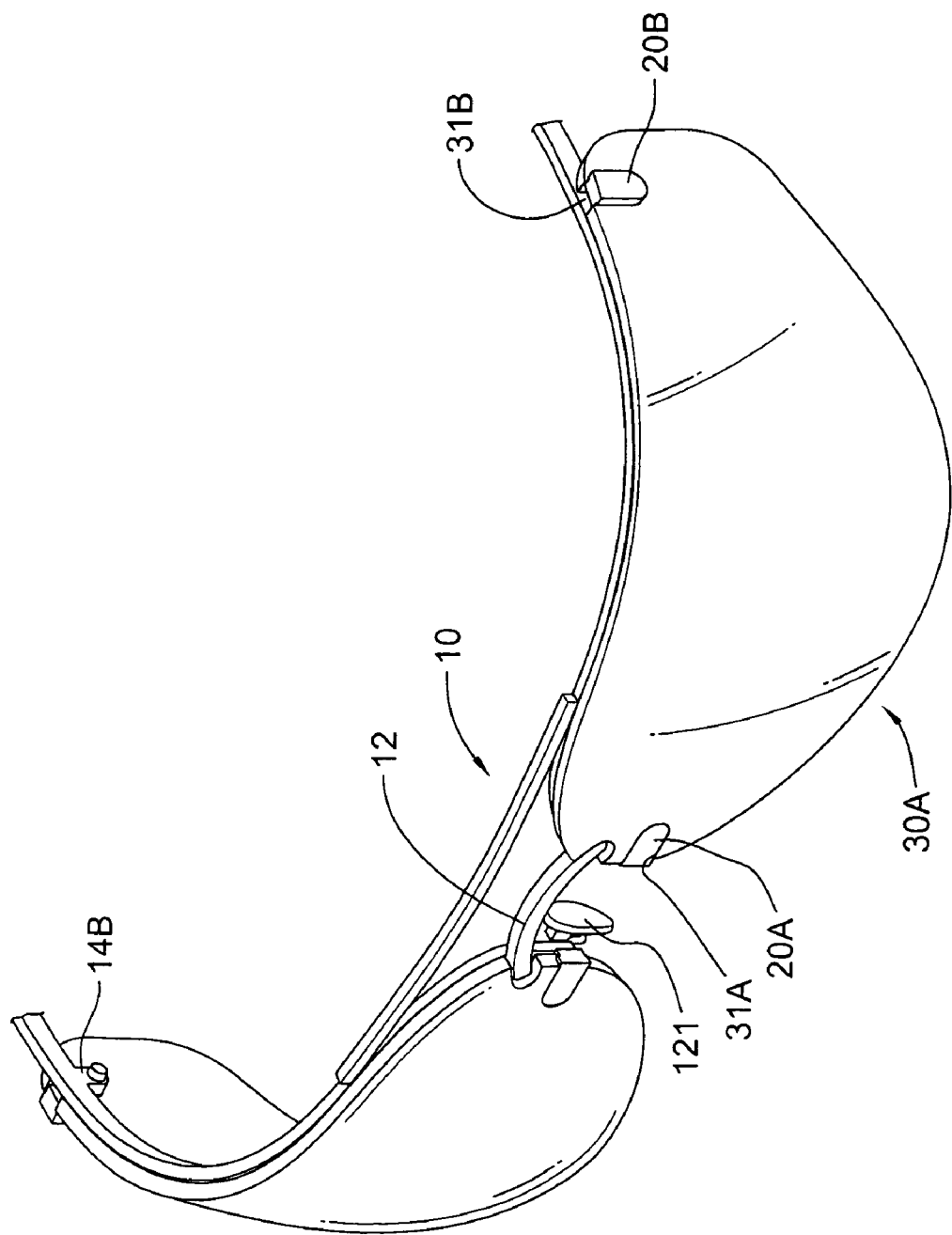
FIG. 2 is a perspective view of the pair of spectacles in accordance with the present invention.
Figure 3:
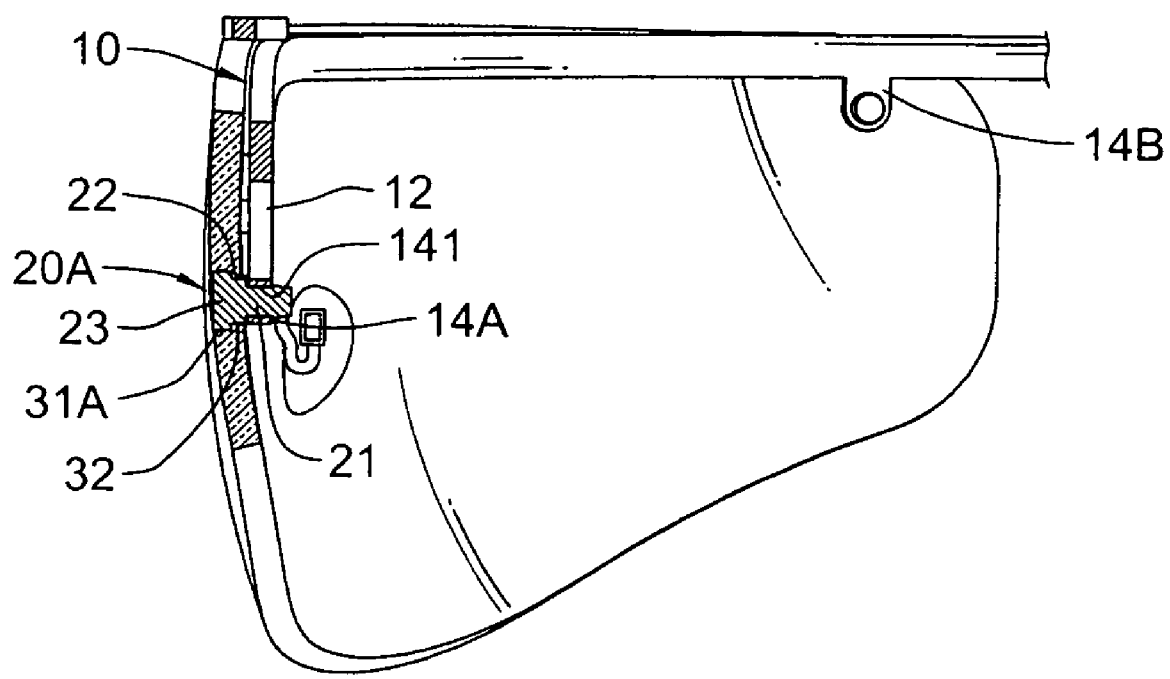
FIG. 3 is a side sectional view of the pair of spectacles in accordance with the present invention.
Figure 4:
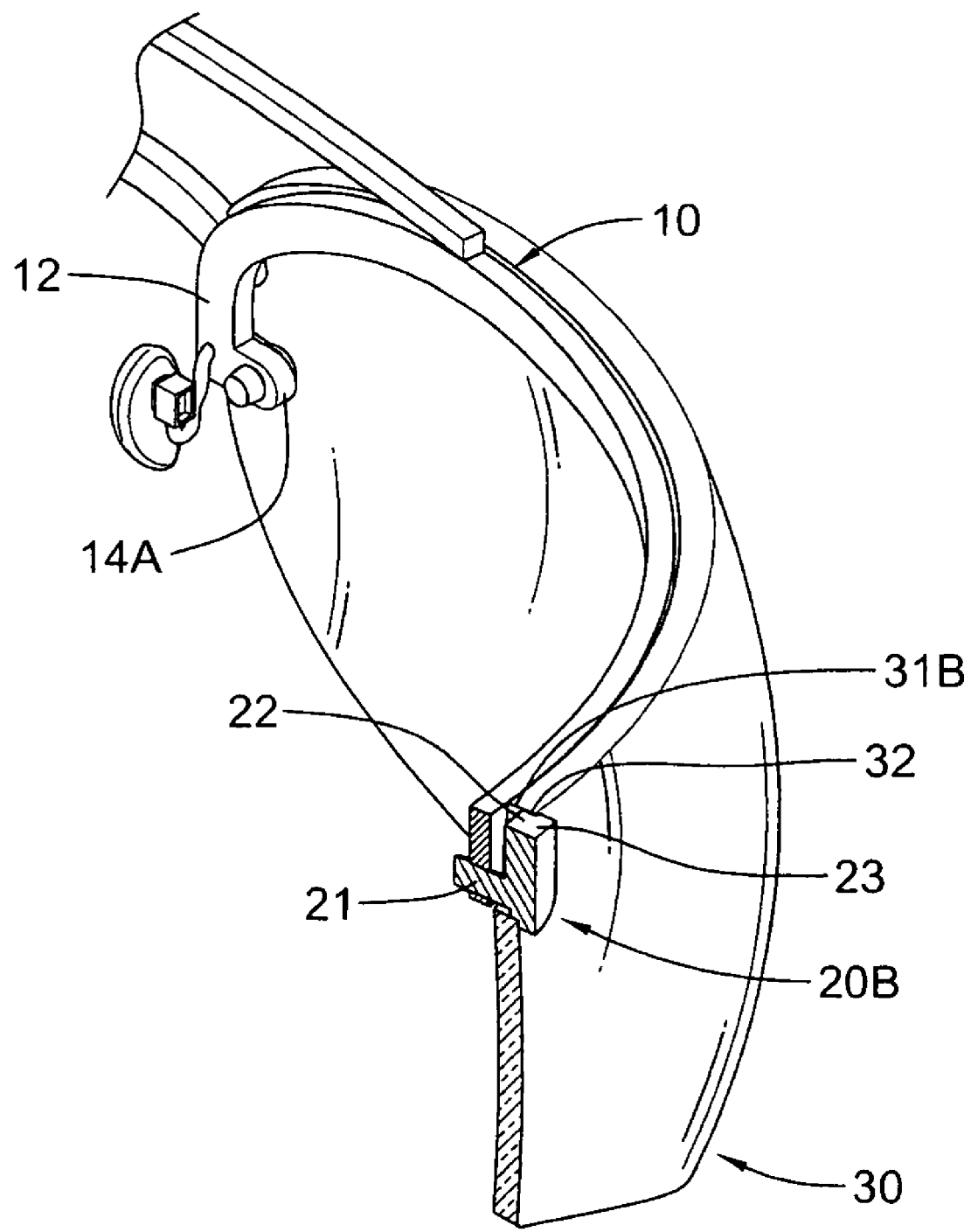
FIG. 4 is a sectional partial view of the pair of spectacles in accordance with the present invention.

With reference to FIGS. 1–4, a pair of spectacles is composed of a frame (10) and two lenses (30).

The frame (10) comprises a transverse skeleton (11), and a bridge (12) mounted between two symmetric members (13) of the skeleton (11). Two nose pads (121) in mirror image of each other are respectively mounted at two inner sides of the bridge (12) and face each other. Two ear pieces are respectively mounted on two distal ends of the skeleton (11), and two symmetrical first lugs (14A) are integrally and transversely formed on distal ends of the members (13) and adjacent to the nose pads (121). Two symmetrical second lugs (14B) are downwardly formed near free ends of the members (13). The first and the second lug (14A, 14B) are respectively defined with a hole (141) and two first tabs (20A) are respectively mounted on the first lugs (14A) and two second tabs (20B) are respectively mounted on the second lugs (14B). The first and the second tabs (20A, 20B), which are made of plastic cement, are respectively composed of a rod (21) inserted into the hole (141), a plane (22) and a stopping block (23). The plane (22), with an arcuate lower end is integrally formed in an end face of and perpendicular to the rod (21) and a side of the plane (22) is slightly bigger than that of the end face of the rod (21). The stopping block (23) is integrally formed on the plane (22) and two opposed edges of the stopping block (23) extend out of edges of the plane (22).

Lenses (30), which are mounted on the members (13), are respectively defined with a first channel (31A) and a second channel (31B), both of which are defined in a periphery of the lenses (30). The first and the second channel (31A, 31B) are respectively composed of a slot (32) mated with the plane (22), and an open enddefined in an upper end of the slot (32). The slot (32) is diminished in the width size from the open end to an arcuate lower end thereof thereby fastening to the first and second tab (20A, 20B).

With reference to FIG. 1, it is to be appreciated that the thickness of each lens may vary along its length and height as well as in different lenses. When a portion of the lenses (30), which is adjacent the first channel (31A), is thick, the first channel (31A) is further defined with a cutout (35), the width of which is slightly bigger than that of the plane (22), so that the stopping block (23) can be inserted into the cutout (35). When a portion adjacent to the second channel (31B) of the lenses (30) is thick, the second channel (31B) is further defined with a cutout (35), the width of which is slightly bigger than that of the plane (22), so that the stopping block (23) can be inserted into the cutout (35).

In assembly, the rods (21) are respectively inserted into the slot (32) and the holes (141) in turn and the planes (22) are respectively securely mated with the slot (32) via the slot (32) grasping the plane (22). The stopping blocks (23) respectively abut the lenses (30) so that the lenses (30) can be securely mounted on the framework (10) with convenient assembly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pair of spectacles comprising:
a frame having a skeleton transversely formed therein and a bridge formed in the skeleton and dividing the skeleton into two symmetrical members each having a distal end and a free end;
two first lugs transversely formed respectively on the distal ends of the symmetrical members, adjacent to the bridge and each having a hole defined therethrough;
two second lugs uprightly formed respectively on the free ends of the symmetrical members opposite to the bridge;
two lenses mounted respectively on the symmetrical members and each lens having
an outer edge; and
a first channel defined in the outer edge of the lens; and
a second channel defined in the outer edge of the lens;
two first tabs mounted respectively on the lenses, and each first tabs having
a rod mounted through the first channel of the lens and the hole of the first lug in turn and having an end face;

a plane integrally formed on the end face of the rod, being perpendicular to the rod and having two opposite edges and a side being slightly bigger than the end face of the rod; and a stopping block integrally formed on the plane and having two opposed edges extending out of the edges of the plane; and two second tabs mounted respectively on the lenses through the second channels and the frame in turn; whereby the lenses are securely provided on the frame.

2. The pair of spectacles as claimed in claim 1, wherein each of the second lugs has a hole defined therethrough; and each of the second tabs has a rod mounted through the second channel of the lens and the hole of the second lug in turn and having an end face;

a plane integrally formed on the end face of the rod, being perpendicular to the rod and having two opposite edges and a side being slightly bigger than the end face of the rod; and a stopping block integrally formed on the plane and having two opposed edges extending out of the edges of the plane.

3. The pair of spectacles as claimed in claim 2, wherein the first and the second channels respectively have a slot mated with the plane of a corresponding one of the first and the second tabs and having an upper end and an arcuate lower end; and an open end defined in the upper end of the slot, wherein the slot has a width that diminishes from the open end to the arcuate lower end of the slot for fastening the first and second tab; and the plane of each one of the first and the second tabs has an arcuate lower end mated with the arcuate lower end of a corresponding slot.

4. The pair of spectacles as claimed in claim 2, wherein each of the first channels has a cutout defined therein and having a width slightly bigger than a width of the plane of a corresponding one of the first and the second tabs for receiving the stopping block.

* * * * *